US008838176B2

(12) United States Patent
Kuo et al.

(10) Patent No.: US 8,838,176 B2
(45) Date of Patent: Sep. 16, 2014

(54) HIGH GAIN ANTENNA AND WIRELESS DEVICE USING THE SAME

(75) Inventors: Cheng-Hao Kuo, Hualien County (TW); Hsiao-Ting Huang, Hsinchu County (TW); Shao-Chin Lo, Miaoli County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 271 days.

(21) Appl. No.: 13/347,635

(22) Filed: Jan. 10, 2012

(65) Prior Publication Data

US 2013/0178169 A1 Jul. 11, 2013

(51) Int. Cl.
*H04M 1/00* (2006.01)

(52) U.S. Cl.
USPC ........................................................ 455/562.1

(58) Field of Classification Search
USPC ............. 455/562.1, 575.7, 97, 129, 269, 274; 343/793
See application file for complete search history.

(56) References Cited

U.S. PATENT DOCUMENTS 6,025,812 A * 2/2000 Gabriel et al. ................ 343/797

* cited by examiner

*Primary Examiner* — Eugene Yun
(74) *Attorney, Agent, or Firm* — Winston Hsu; Scott Margo

(57) ABSTRACT

The present invention discloses a high gain antenna. The high gain antenna includes a first dipole antenna, formed on a substrate; a parallel reflection metal sheet, formed on the substrate and in parallel with the first dipole antenna; a first vertical reflection metal sheet, vertically disposed on a front side of the substrate and behind the first dipole antenna; and a second vertical reflection metal sheet, vertically disposed on a back side of the substrate and behind the first dipole antenna.

20 Claims, 14 Drawing Sheets

HIGH GAIN ANTENNA AND WIRELESS DEVICE USING THE SAME

BACKGROUND

1. Field of the Invention

The present invention relates to a high gain antenna and wireless device using the same, and more particularly, to a high gain antenna and wireless device using the same utilizing a parallel reflection metal sheet plus vertical reflection metal sheets to form a three dimensional reflector, to increase antenna directivity and enhance antenna gain.

2. Description of the Prior Art

Antenna design is crucial to a portable device with wireless communication function, such as wireless local area network (WLAN) or other mobile communication systems. Take WLAN as an example, the antenna for an access point (AP) is usually an Omni-antenna to service stations (STA) within a certain space. Therefore, a high gain antenna at the STA helps to receive the signal from AP. Moreover, in the case when an AP uses a smart antenna, a high gain antenna will also help to improve the efficiency.

Please refer to FIG. 1, which is a schematic diagram of a conventional dipole antenna 10 and a corresponding radiation pattern $RP_1$. As shown in FIG. 1, the dipole antenna 10 has the omni directional radiation pattern $RP_1$ in a y-z plane, and only has an antenna gain of 2 dBi, which is not enough for some applications requiring high antenna gain.

Under such a situation, a parallel metal reflection sheet is often added behind an antenna to increase antenna directivity and enhance antenna gain. For example, please refer to FIG. 2, which is a schematic diagram of a conventional dipole antenna 20 with a parallel metal reflection sheet 22 and a corresponding radiation pattern $RP_2$. As shown in FIG. 2, the parallel metal reflection sheet 22 is added behind the dipole antenna 20 (−y direction). Therefore, the parallel metal reflection sheet 22 reflects radiation of the dipole antenna 20 in the −y direction toward the +y direction, and also narrows half power beamwidth in an x-y plane. As a result, an antenna gain increases to 4-5 dBi.

However, an antenna gain of 4-5 dBi derived by utilizing the parallel metal reflection sheet is not enough, and thus the prior art needs to add a parallel metal reflection sheet with large area, which requires more space and affects input impedance. Thus, there is a need to improve over the prior art.

SUMMARY

It is therefore an objective of the present invention to provide a high gain antenna utilizing a parallel reflection metal sheet plus vertical reflection metal sheets to form a three dimensional reflector, to increase antenna directivity and enhance antenna gain.

The present invention discloses a high gain antenna. The high gain antenna includes a first dipole antenna, formed on a substrate; a parallel reflection metal sheet, formed on the substrate and in parallel with the first dipole antenna; a first vertical reflection metal sheet, vertically disposed on a front side of the substrate and behind the first dipole antenna; and a second vertical reflection metal sheet, vertically disposed on a back side of the substrate and behind the first dipole antenna.

The present invention further discloses a wireless device. The wireless device includes a transceiver having an antenna to transmit or receive wireless signal, and a processor coupled to the transceiver to process the transmitted or received wireless signal. The antenna includes a first dipole antenna, formed on a substrate, a parallel reflection metal sheet, formed on the substrate and in parallel with the first dipole antenna, a first vertical reflection metal sheet, vertically disposed on a front side of the substrate and behind the first dipole antenna, and a second vertical reflection metal sheet, vertically disposed on a back side of the substrate and behind the first dipole antenna.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
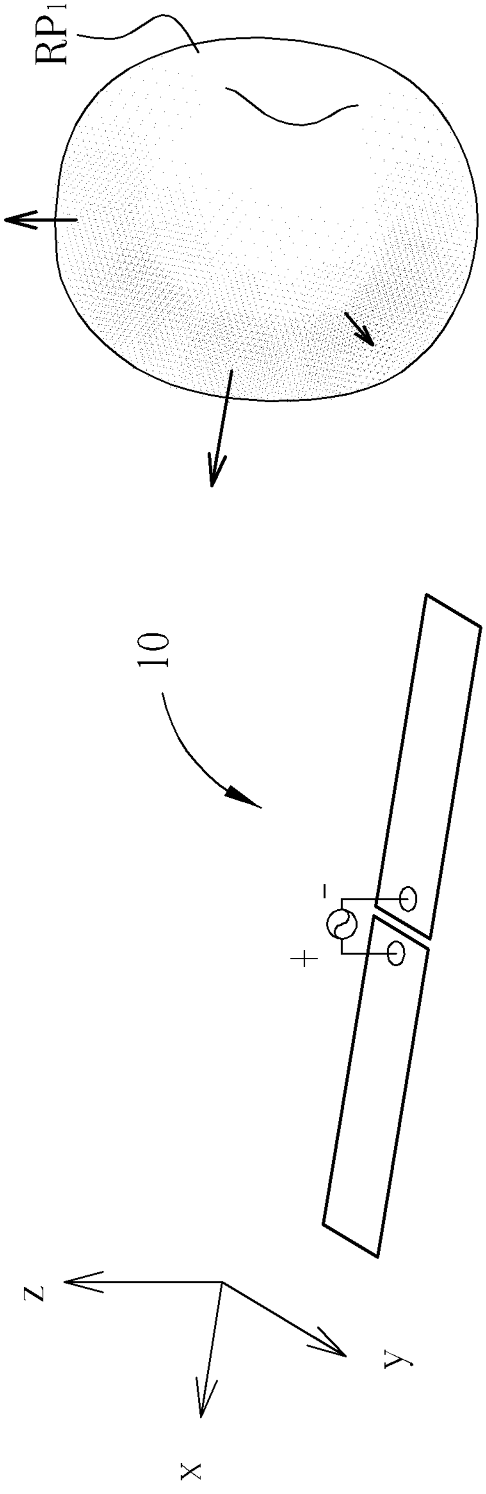
FIG. 1 PRIOR ART
FIG. 1 is a schematic diagram of a conventional dipole antenna and a corresponding radiation pattern.
Figure 2:
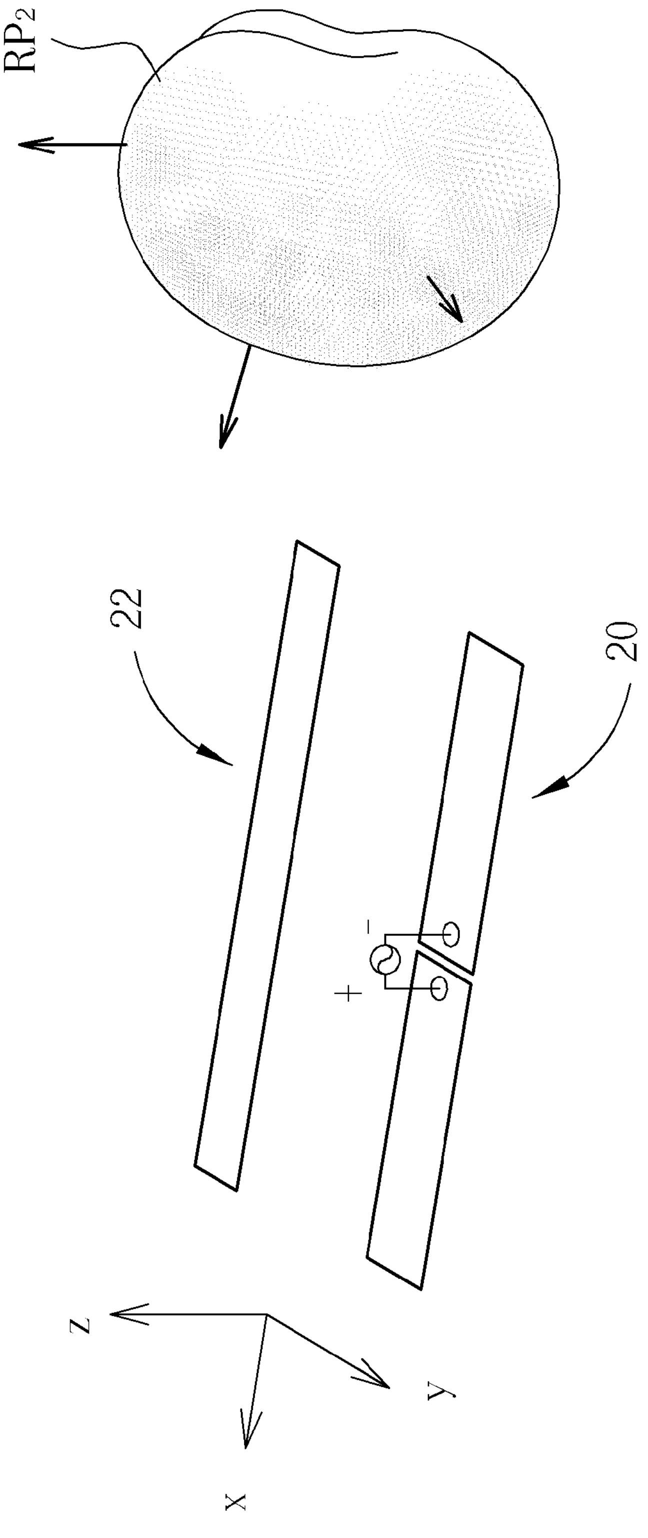
FIG. 2 PRIOR ART
FIG. 2 is a schematic diagram of a conventional dipole antenna with a parallel metal reflection sheet and a corresponding radiation pattern.
Figure 3:
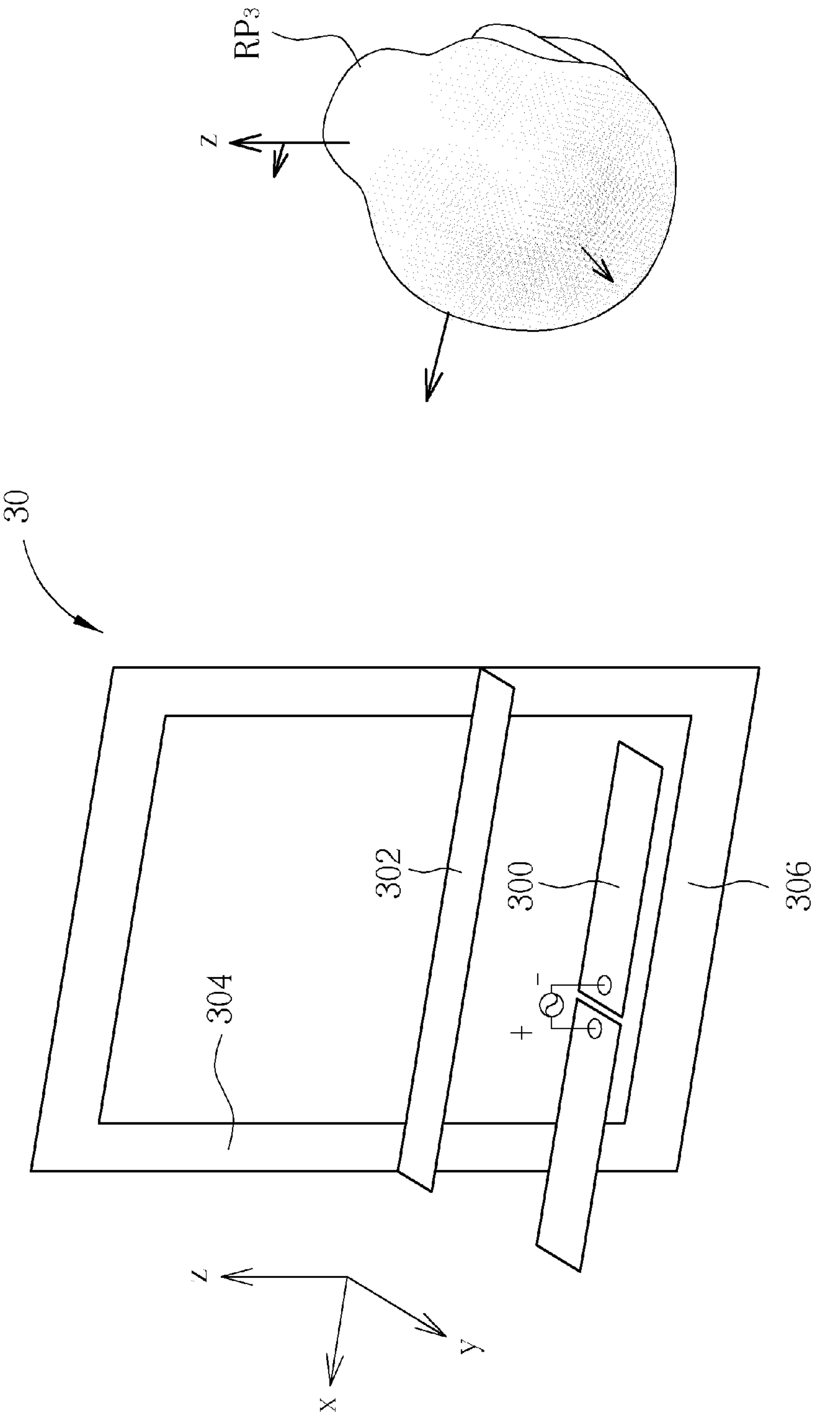
FIG. 3 is a schematic diagram of a high gain antenna and a corresponding radiation pattern according to an embodiment of the present invention.

Please refer to FIG. 3, which is a schematic diagram of a high gain antenna 30 and a corresponding radiation pattern $RP_3$ according to an embodiment of the present invention. The high gain antenna 30 is formed on a substrate, e.g. a Printed Circuit Board (PCB) 32, and includes a dipole antenna 300, a parallel reflection metal sheet 302, and vertical reflection metal sheets 304, 306. The dipole antenna 300 is formed on the PCB 32. The parallel reflection metal sheet 302 is formed on the PCB 32, and in parallel with and behind the dipole antenna 300 (−y direction). The vertical reflection metal sheet 304 is vertically disposed on a front side of the PCB 32 and behind the dipole antenna 300, and the vertical reflection metal sheet 306 is vertically disposed on a back side of the PCB 32 and behind the dipole antenna 300.

In other words, a difference between the high gain antenna 30 and the conventional dipole antenna 20 with the parallel metal reflection sheet 22 is that the high gain antenna 30 further includes the vertical reflection metal sheets 304, 306. Under such a situation, other than narrowing half power beamwidth in an x-y plane, the high gain antenna 30 can further narrows half power beamwidth in the y-z plane. As a result, the high gain antenna 30 can increase an antenna gain to 7-9 dBi.

Figure 4:
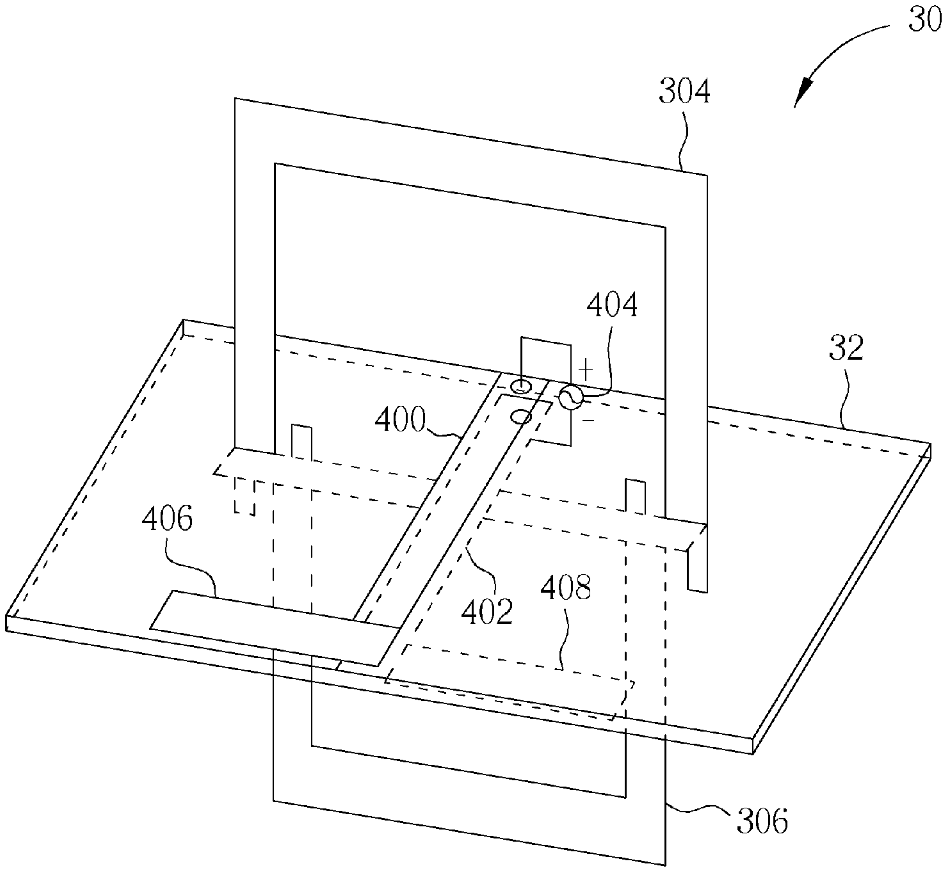
FIG. 4 is a schematic diagram of a detailed structure of the high gain antenna shown in FIG. 3 according to an embodiment of the present invention.

Specifically, please refer to FIG. 4, which is a schematic diagram of a detailed structure of the high gain antenna 30 shown in FIG. 3 according to an embodiment of the present invention. As shown in FIG. 4, the high gain antenna 30 further includes a fire-wire metal sheet 400, a ground metal sheet 402 and a feed-in signal source 404, and the dipole antenna 300 further includes radiation metal sheets 406, 408.

In detail, the PCB 32 is in a shape of a rectangular. The dipole antenna 300 is formed near a lower edge of the PCB 32, and includes the radiation metal sheet 406 formed on the front side of the PCB 32, and the radiation metal sheet 408 formed on the back side of the PCB 32, wherein the radiation metal sheet 406, 408 are substantially in parallel with the lower edge of the PCB 32. The fire-wire metal sheet 400 is formed on the front side of the PCB 32, and has one end near an upper edge opposite to the lower edge of the PCB 32 as a feed point of the dipole antenna 300, and another end connected with the radiation metal sheet 406. The ground metal sheet 402 is formed on the back side of the PCB 32, and has one end near the upper edge opposite to the lower edge of the PCB 32 as a ground point of the dipole antenna 300, another end connected with the radiation metal sheet 408, and two ends extending in parallel with the dipole antenna 300 to form the parallel reflection metal sheet 302. The vertical reflection metal sheet 304 is in a shape of Π, and the vertical reflection metal sheet 306 is in a shape of U. The feed-in signal source 404 has a feed point connected with the one end of the fire-wire metal sheet 400 near the upper edge of the PCB 32, and a ground point connected with the one end of the ground metal sheet 402 near the upper edge of the PCB 32.

Under such a situation, the dipole antenna 300, i.e. the radiation metal sheets 406 and 408, acts as a main radiator and has a length of a half wavelength of a resonant frequency. The fire-wire metal sheet 400 and the ground metal sheet 402 are parallel-plate feed-in lines of the dipole antenna 300. The two ends of the ground metal sheet 402 extending in parallel with the dipole antenna 300 forms the parallel reflection metal sheet 302. As a result, structure of the dipole antenna 300 shown in FIG. 4 can realize function illustrated in FIG. 3.

Figure 5A:
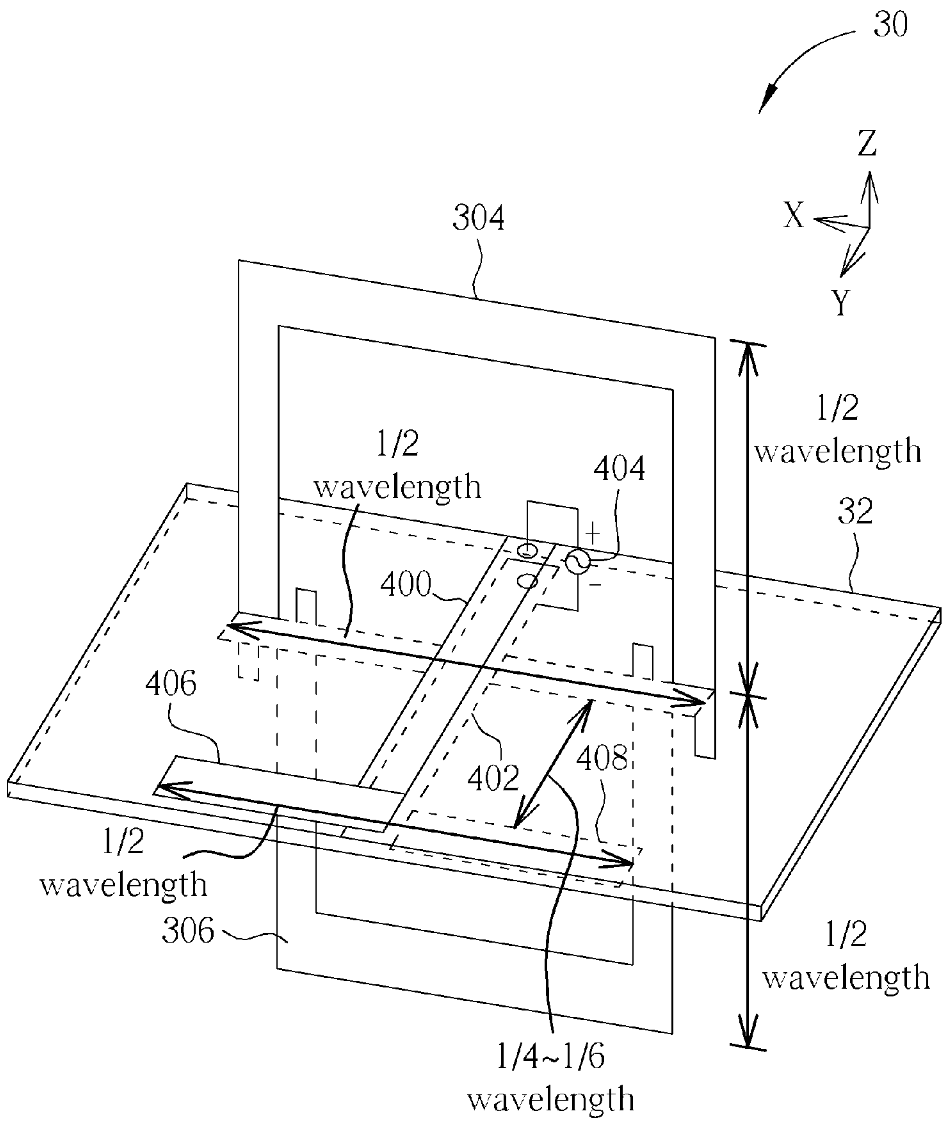
FIG. 5A is a schematic diagram of a detailed size of the high gain antenna 30 shown in FIG. 4 according to an embodiment of the present invention.

Please refer to FIG. 5A, which is a schematic diagram of a detailed size of the high gain antenna 30 shown in FIG. 4 according to an embodiment of the present invention. As shown in FIG. 5A, in a preferable embodiment, a length of the dipole antenna 300, i.e. the radiation metal sheets 406 and 408, is substantially a half wavelength of a resonant frequency, e.g. 5 GHz, a length of the parallel reflection metal sheet 302 is substantially a half wavelength of the resonant frequency, a distance between the dipole antenna 300 and the parallel reflection metal sheet 302 is substantially a quarter to a sixth wavelength of the resonant frequency, heights of the vertical reflection metal sheets 304, 306 are substantially a half wavelength of the resonant frequency, and distances between the dipole antenna 300 and the vertical reflection metal sheets 304, 306 are also substantially a quarter to a sixth wavelength of the first resonant frequency.

Figure 5B:
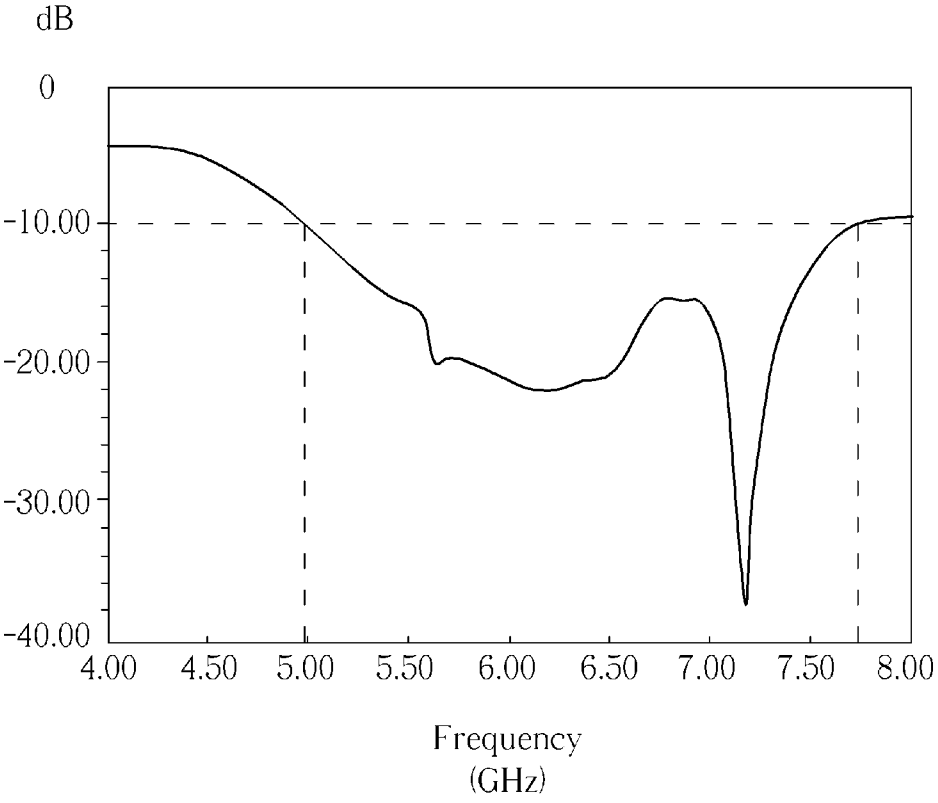
FIG. 5B is a schematic diagram of return loss of the high gain antenna shown in FIG. 5A according to an embodiment of the present invention.
Figure 5C:
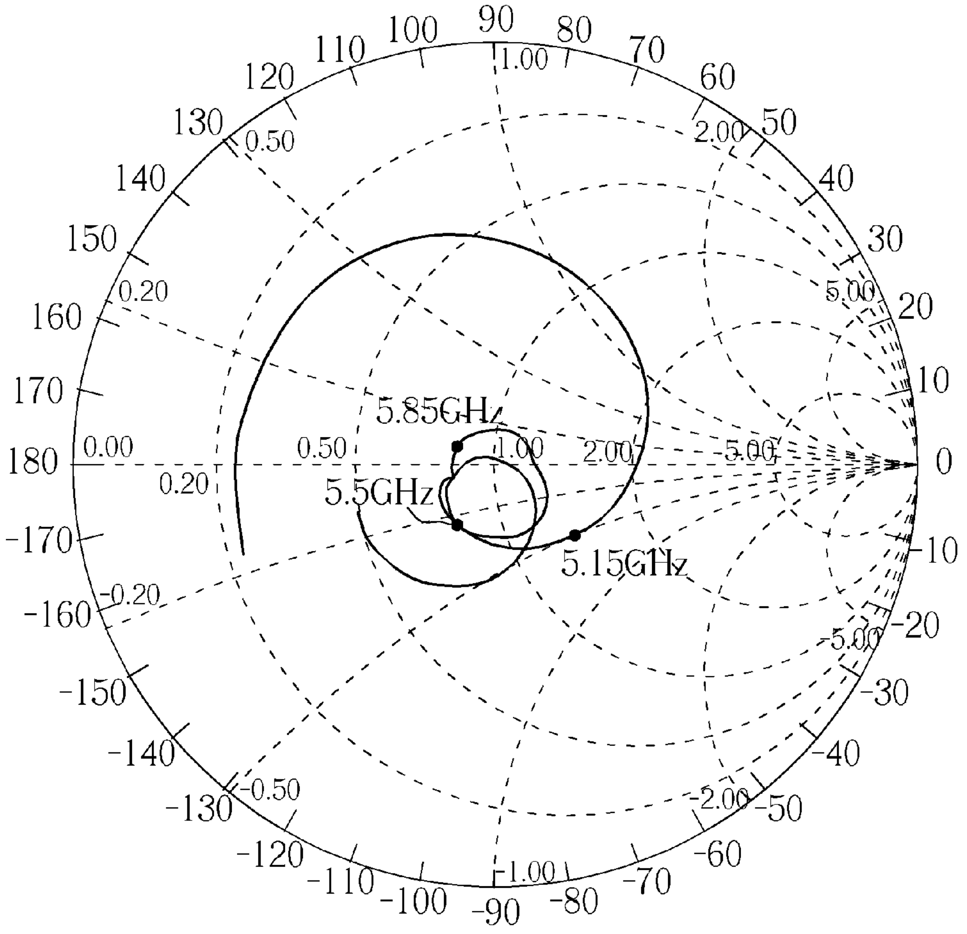
FIG. 5C is a schematic diagram of a Smith chart of the high gain antenna shown in FIG. 5A according to an embodiment of the present invention.
Figure 5D:
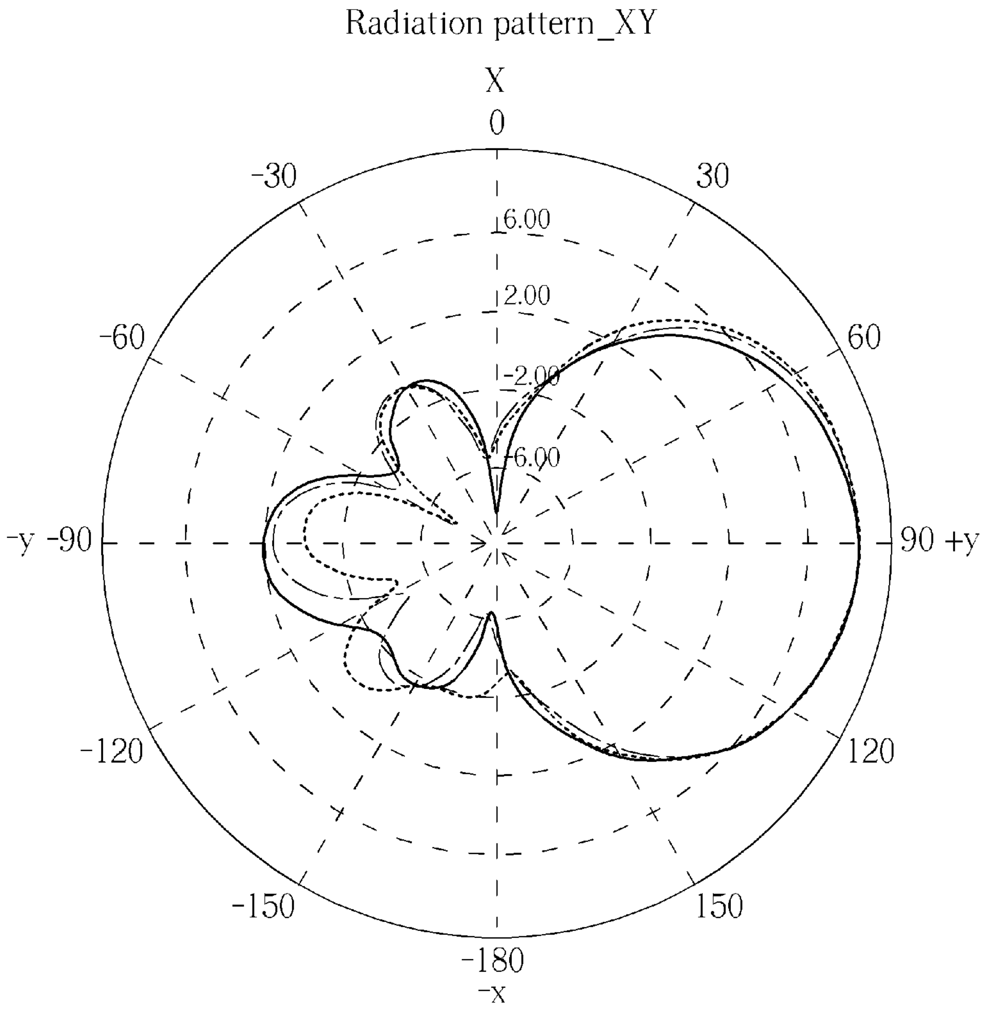
FIG. 5D and FIG. 5E are schematic diagrams of radiation patterns of the high gain antenna shown in FIG. 5A in an x-y plane and in a y-z plane according to an embodiment of the present invention, respectively.
Figure 5E:
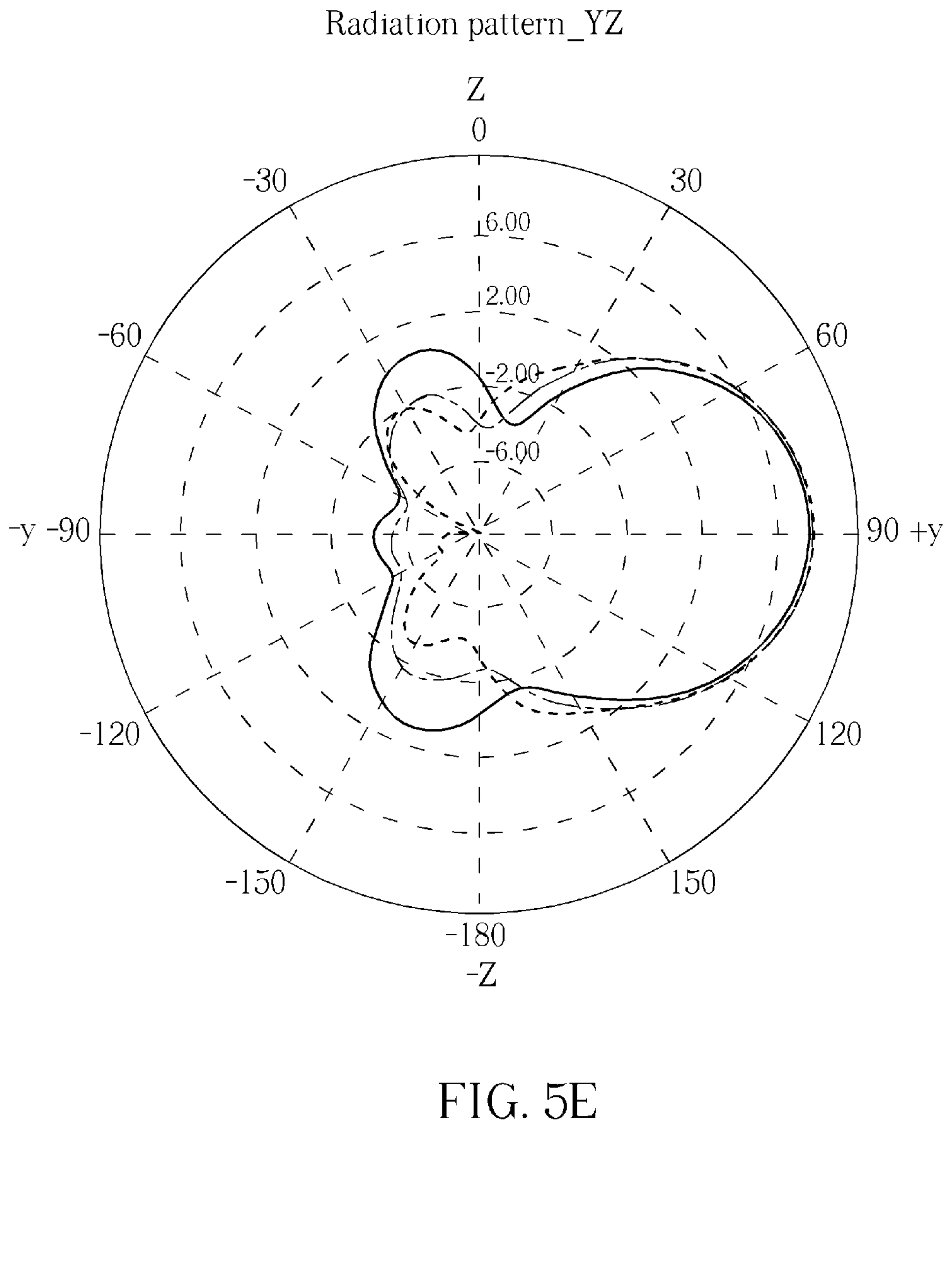

Under such a configuration, pleaser refer to FIG. 5B to FIG. 5E. FIG. 5B is a schematic diagram of return loss of the high gain antenna 30 shown in FIG. 5A according to an embodiment of the present invention. FIG. 5C is a schematic diagram of a Smith chart of the high gain antenna 30 shown in FIG. 5A according to an embodiment of the present invention. FIG. 5D and FIG. 5E are schematic diagrams of radiation patterns of the high gain antenna 30 shown in FIG. 5A in an x-y plane and in a y-z plane according to an embodiment of the present invention, respectively. As shown in FIG. 5B, when the size of the high gain antenna 30 is designed to meet requirement of the resonant frequency as 5 GHz, a bandwidth ranges from 4.98 GHz to 7.69 GHz and reaches 42.8% if a criteria of the return loss is set as 10 dB. As shown in FIG. 5C, during 5-6 GHz, real parts of impedance of the high gain antenna 30 approximate 50 ohm. As shown in FIG. 5D and FIG. 5E, radiation pattern of the high gain antenna 30 directs mainly toward +y direction and antenna gain reaches 7.6 dBi. As a result, the high gain antenna 30 designed to comply with requirements shown in FIG. 5A can achieve desirable bandwidth, impedance, radiation pattern and high antenna gain.

Noticeably, the spirit of the present invention is to further utilize the vertical reflection metal sheets 304, 306 to narrow half power beamwidth in an y-z plane, so as to further increase the antenna gain. Those skilled in the art should make modifications or alterations accordingly. For example, the antenna 300 is not limited to a dipole antenna, and can be other antenna types as long as correspondingly modifications are made. Besides, the high gain antenna 30 is not limited to any particular shapes, and can be modified to adapt to any antenna design.

Figure 6:
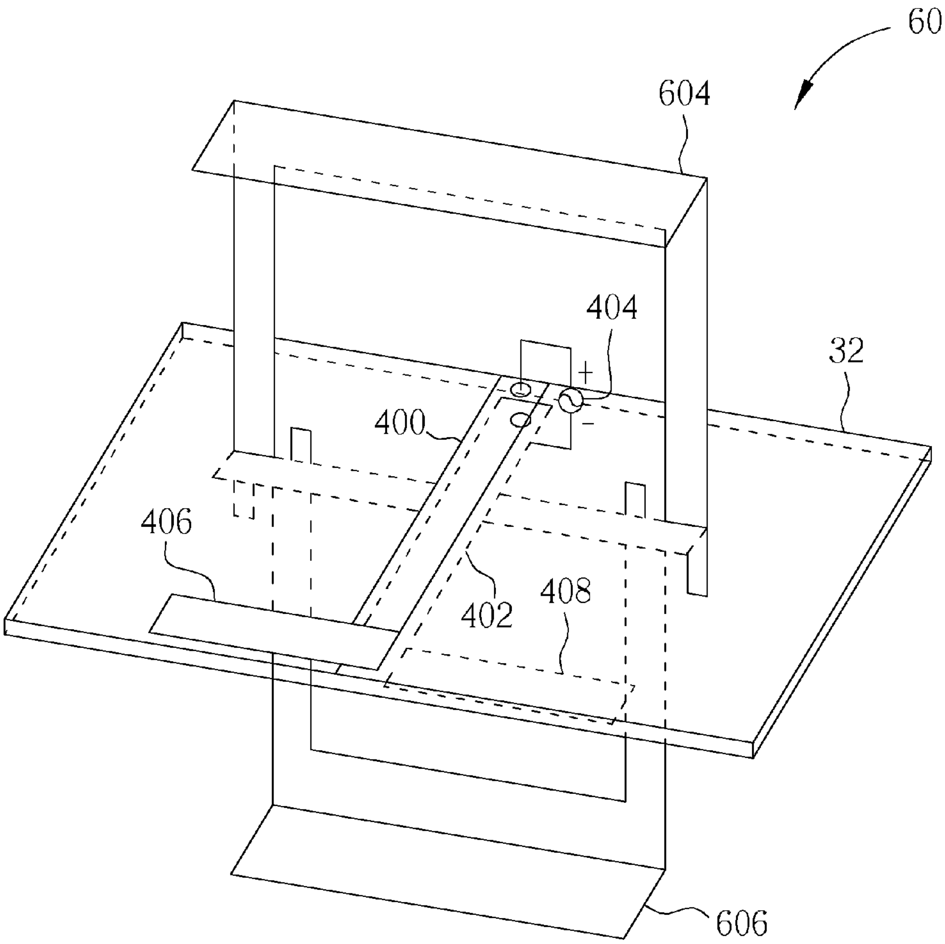
FIG. 6 to FIG. 9 are schematic diagrams of high gain antennas according to alterations of the present invention.
Figure 7:
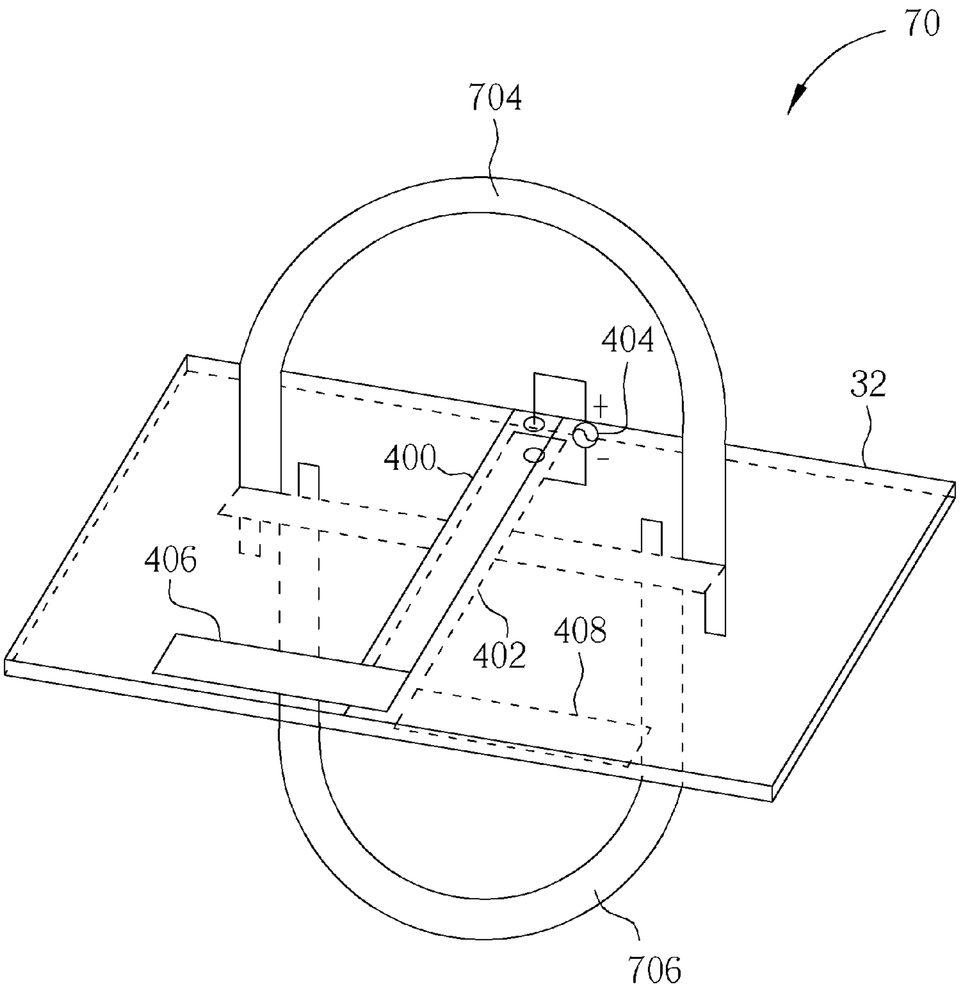
Figure 8:
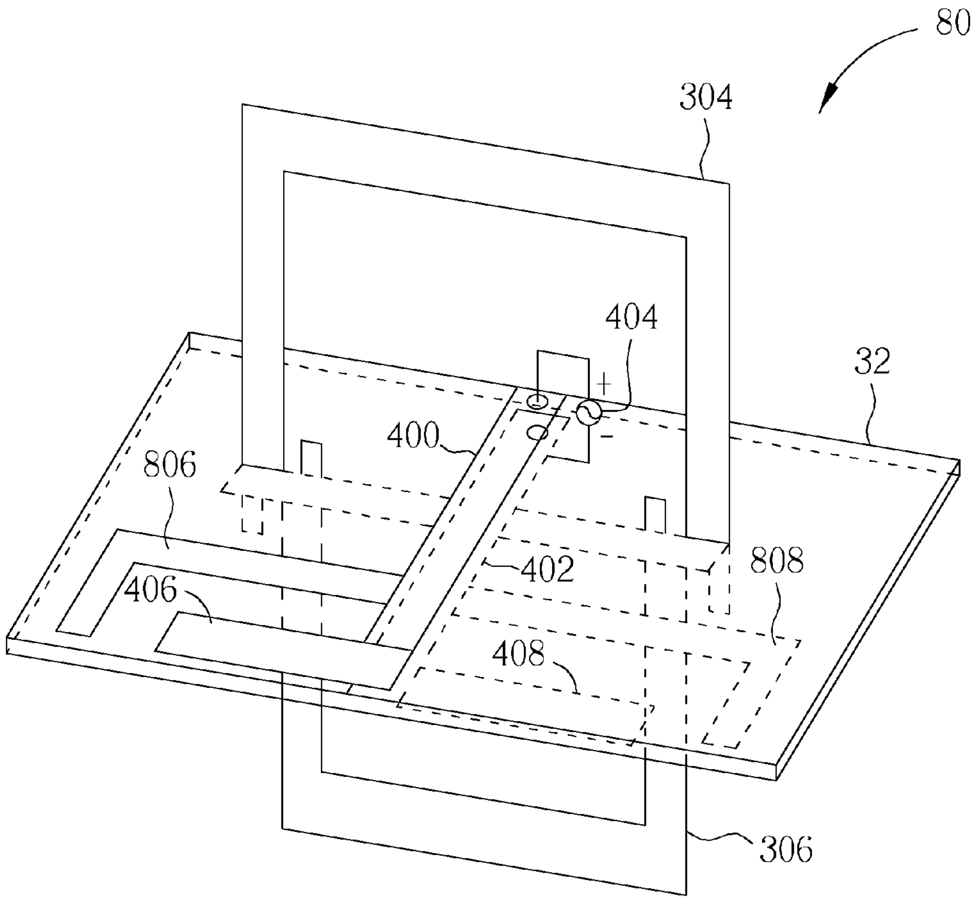
Figure 9:
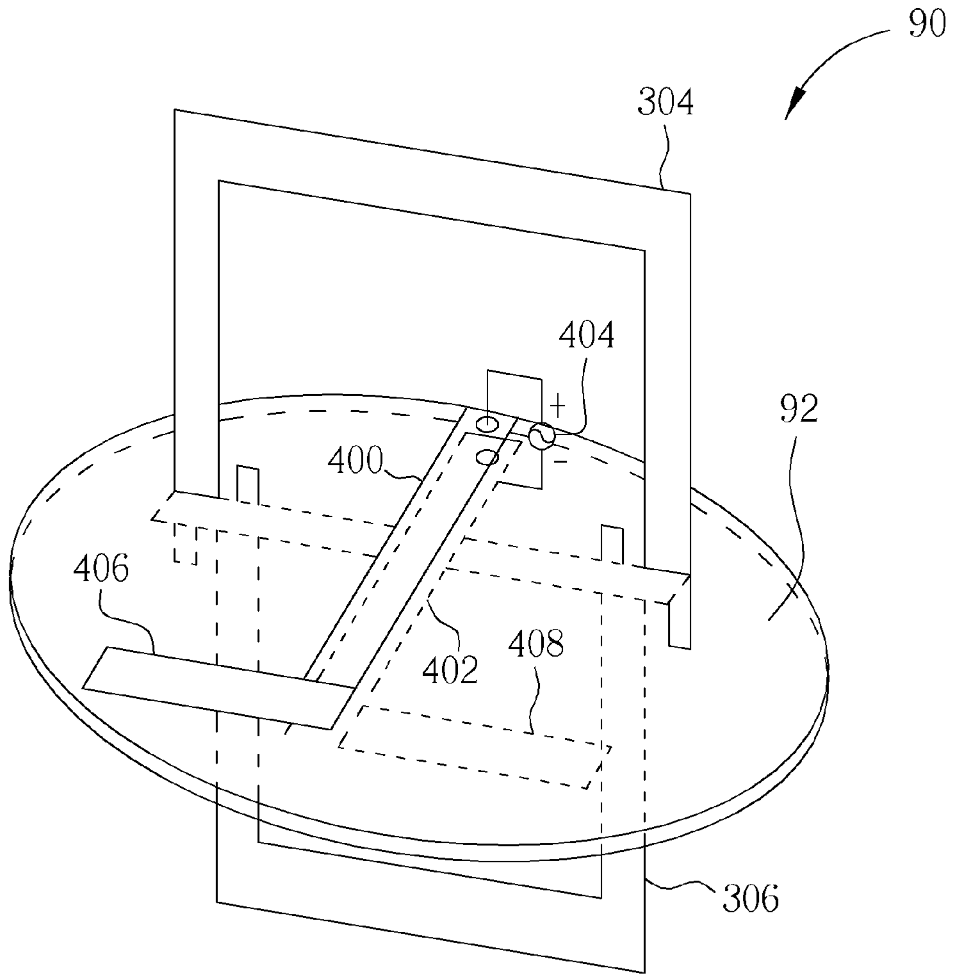

For example, please refer to FIG. 6 to FIG. 9, which are schematic diagrams of high gain antennas 60, 70, 80, 90 according to alterations of the present invention. The high gain antennas 60, 70, 80, 90 shown in FIG. 6 to FIG. 9 have similar structures and function as the high gain antenna 30 shown in FIG. 4, and thus components with similar functions are denoted by same symbols. As shown in FIG. 6, a difference between the high gain antenna 60 and the high gain antenna 30 shown in FIG. 4 is that vertical reflection metal sheets 604, 606 are bended, which requires less vertical space and can further narrow half power beamwidth in the y-z plane to increase the antenna gain. Besides, as shown in FIG. 7, a difference between the high gain antenna 70 and the high gain antenna 30 shown in FIG. 4 is that vertical reflection metal sheets 704, 706 are in a shape of a half ellipse, respectively, which can adapt to ellipse housing mechanism.

Moreover, a difference between the high gain antenna 80 and the high gain antenna 30 shown in FIG. 4 is that another dipole antenna, i.e. a radiation metal sheet 806 formed on the front side of the PCB 32 and a radiation metal sheet 808 formed on the back side of the PCB 32, is added and operates at another resonant frequency, e.g. 2.4 GHz, such that the high gain antenna 80 has dual frequency bands but the structure of the high gain antenna 80 only optimizes the dipole antenna 300. Furthermore, a difference between the high gain antenna 90 and the high gain antenna 30 shown in FIG. 4 is that the high gain antenna 90 is formed on a PCB 92 which is in a shape of an ellipse. As can be seen from the above, various modifications or alterations can be made on the antenna design, such that the high gain antenna of the present invention can meet different practical requirements as long as vertical reflection metal sheets are utilized to narrow half power beamwidth in the y-z plane.

Figure 10:
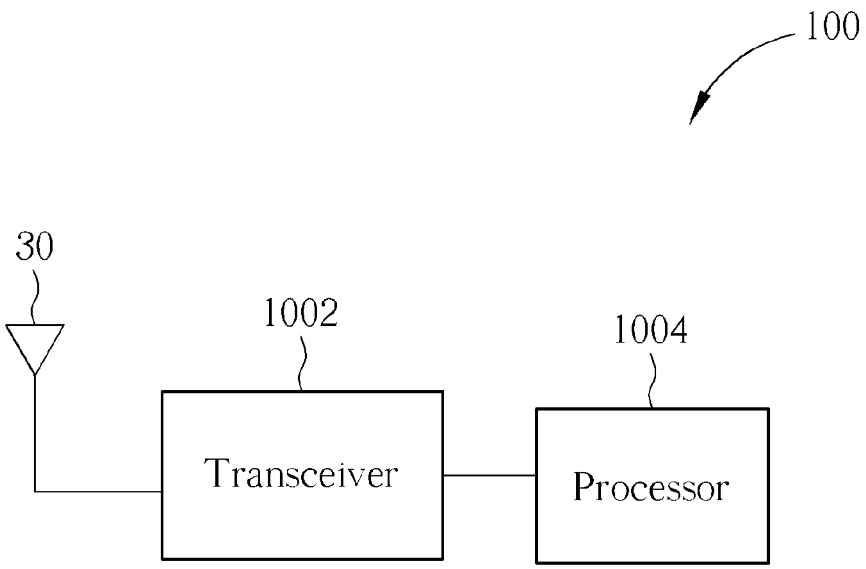
FIG. 10 is a schematic diagram of a wireless device according to an embodiment of the present invention.

On the other hand, for application of the high gain antenna 30, please refer to FIG. 10, which is a schematic diagram of a wireless device 100 according to an embodiment of the present invention. The wireless device 100 includes a transceiver 1002 and a processor 1004. The transceiver 1002 has the antenna 30 to transmit or receive wireless signal, and the processor 1004 is coupled to the transceiver to process the transmitted or received wireless signal, such that the wireless device 100 can utilize the high gain antenna 30 to obtain better antenna gain. The function and structure of the high gain antenna 30 can be derived by referring to the above descriptions, which is not narrated hereinafter.

In the prior art, an antenna gain of 4-5 dBi derived by utilizing the parallel metal reflection sheet is not enough, and thus the prior art needs to add a parallel metal reflection sheet with large area, which requires more space and affects input impedance. In comparison, the present invention further utilizes vertical reflection metal sheets to narrow half power beamwidth in the y-z plane, so as to further increase the antenna gain.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high gain antenna, comprising:

a first dipole antenna, formed on a substrate;

a parallel reflection metal sheet, formed on the substrate and in parallel with the first dipole antenna;

a first vertical reflection metal sheet, vertically disposed on a front side of the substrate and behind the first dipole antenna; and a second vertical reflection metal sheet, vertically disposed on a back side of the substrate and behind the first dipole antenna.

2. The high gain antenna of claim 1, wherein the substrate is in a shape of a rectangular.

3. The high gain antenna of claim 1, wherein the first dipole antenna is formed near a first edge of the substrate, and comprises a first radiation metal sheet formed on the front side of the substrate, a second radiation metal sheet formed on the back side of the substrate, wherein the first radiation metal sheet and the second radiation metal sheet are substantially in parallel with the first edge of the substrate.

4. The high gain antenna of claim 3 further comprising:

a fire-wire metal sheet, formed on the front side of the substrate, comprising one end near a second edge opposite to the first edge of the substrate as a feed point of the first dipole antenna, and another end connected with the first radiation metal sheet; and a ground metal sheet, formed on the back side of the substrate, comprising one end near the second edge opposite to the first edge of the substrate as a ground point of the first dipole antenna, another end connected with the second radiation metal sheet, and two ends extending in parallel with the first dipole antenna to form the parallel reflection metal sheet.

5. The high gain antenna of claim 1, wherein the first vertical reflection metal sheet is in a shape of Π, and the second vertical reflection metal sheet is in a shape of U.

6. The high gain antenna of claim 1, wherein a length of the first dipole antenna is substantially a half wavelength of a first resonant frequency, a length of the parallel reflection metal sheet is substantially a half wavelength of the first resonant frequency, a distance between the first dipole antenna and the parallel reflection metal sheet is substantially a quarter to a sixth wavelength of the first resonant frequency, heights of the first vertical reflection metal sheet and the second vertical reflection metal sheet are substantially a half wavelength of the first resonant frequency, and distances between the first dipole antenna and the first vertical reflection metal sheet and the second vertical reflection metal sheet are substantially a quarter to a sixth wavelength of the first resonant frequency.

7. The high gain antenna of claim 1, wherein the first vertical reflection metal sheet and the second vertical reflection metal sheet are bended.

8. The high gain antenna of claim 1, wherein the first vertical reflection metal sheet is in a shape of a half ellipse, and the second vertical reflection metal sheet is in a shape of a half ellipse.

9. The high gain antenna of claim 1 further comprising a second dipole antenna, formed on the substrate, and operating at a second resonant frequency.

10. The high gain antenna of claim 1, wherein the substrate is in a shape of an ellipse.

11. A wireless device, comprising, a transceiver having an antenna to transmit or receive wireless signal, wherein the antenna comprises, a first dipole antenna, formed on a substrate;

a parallel reflection metal sheet, formed on the substrate and in parallel with the first dipole antenna;

a first vertical reflection metal sheet, vertically disposed on a front side of the substrate and behind the first dipole antenna; and a second vertical reflection metal sheet, vertically disposed on a back side of the substrate and behind the first dipole antenna; and a processor coupled to the transceiver to process the transmitted or received wireless signal.

12. The wireless device of claim 11, wherein the substrate is in a shape of a rectangular.

13. The wireless device of claim 11, wherein the first dipole antenna is formed near a first edge of the substrate, and comprises a first radiation metal sheet formed on the front side of the substrate, a second radiation metal sheet formed on the back side of the substrate, wherein the first radiation metal sheet and the second radiation metal sheet are substantially in parallel with the first edge of the substrate.

14. The wireless device of claim 13 further comprising:

a fire-wire metal sheet, formed on the front side of the substrate, comprising one end near a second edge opposite to the first edge of the substrate as a feed point of the first dipole antenna, and another end connected with the first radiation metal sheet; and a ground metal sheet, formed on the back side of the substrate, comprising one end near the second edge opposite to the first edge of the substrate as a ground point of the first dipole antenna, another end connected with the second radiation metal sheet, and two ends extending in parallel with the first dipole antenna to form the parallel reflection metal sheet.

15. The wireless device of claim 11, wherein the first vertical reflection metal sheet is in a shape of Π, and the second vertical reflection metal sheet is in a shape of U.

16. The wireless device of claim 11, wherein a length of the first dipole antenna is substantially a half wavelength of a first resonant frequency, a length of the parallel reflection metal sheet is substantially a half wavelength of the first resonant frequency, a distance between the first dipole antenna and the parallel reflection metal sheet is substantially a quarter to a sixth wavelength of the first resonant frequency, heights of the first vertical reflection metal sheet and the second vertical reflection metal sheet are substantially a half wavelength of the first resonant frequency, and distances between the first dipole antenna and the first vertical reflection metal sheet and the second vertical reflection metal sheet are substantially a quarter to a sixth wavelength of the first resonant frequency.

17. The wireless device of claim 11, wherein the first vertical reflection metal sheet and the second vertical reflection metal sheet are bended.

18. The wireless device of claim 11, wherein the first vertical reflection metal sheet is in a shape of a half ellipse, and the second vertical reflection metal sheet is in a shape of a half ellipse.

19. The wireless device of claim 11 further comprising a second dipole antenna, formed on the substrate, and operating at a second resonant frequency.

20. The wireless device of claim 11, wherein the substrate is in a shape of an ellipse.

* * * * *